US011442617B1

(12) United States Patent
Ali et al.

(10) Patent No.: US 11,442,617 B1
(45) Date of Patent: Sep. 13, 2022

(54) COMMITTING DATA IN ELECTRONIC DEVICES USING SWIPING GESTURES (71) Applicant: INTUIT INC., Mountain View, CA (US)

(72) Inventors: Safia A. Ali, San Francisco, CA (US); Phillip J. Ohme, San Diego, CA (US); Courtney M. Ferguson, San Diego, CA (US); Ann Catherine Jose, San Jose, CA (US)

(73) Assignee: INTUIT, INC., Mountain View, CA (US)

( * ) Notice: Subject to any disclaimer, the term of this patent is extended or adjusted under 35 U.S.C. 154(b) by 1208 days.

(21) Appl. No.: 14/738,752

(22) Filed: Jun. 12, 2015

(51) Int. Cl.
G06F 3/04883 (2022.01)
G06F 3/0482 (2013.01)
G06F 3/04847 (2022.01)

(52) U.S. Cl.
CPC ........ G06F 3/04883 (2013.01); G06F 3/0482 (2013.01); G06F 3/04847 (2013.01)

(58) Field of Classification Search
CPC .................................................. G06F 3/0488
See application file for complete search history.

(56) References Cited

U.S. PATENT DOCUMENTS

| | | | | |
|---|---|---|---|---|
| 9,460,228 | B2 * | 10/2016 | Greenberg | G06F 40/106 |
| 2002/0087527 | A1 * | 7/2002 | Lawton | G06F 16/951 |
| 2002/0128964 | A1 * | 9/2002 | Baker | G06Q 20/02 |
| | | | | 705/39 |
| 2009/0019313 | A1 * | 1/2009 | Pokala | G06F 9/451 |
| | | | | 714/37 |
| 2009/0132950 | A1 * | 5/2009 | Gibson | G06F 17/2725 |
| | | | | 715/780 |
| 2010/0304729 | A1 * | 12/2010 | Sabotta | H04M 3/42365 |
| | | | | 455/415 |
| 2011/0157029 | A1 * | 6/2011 | Tseng | G06F 3/04883 |
| | | | | 345/173 |
| 2011/0238512 | A1 * | 9/2011 | Doty | G06Q 20/204 |
| | | | | 705/17 |
| 2012/0192056 | A1 * | 7/2012 | Migos | G06F 17/241 |
| | | | | 715/230 |
| 2012/0223889 | A1 * | 9/2012 | Medlock | G06F 40/274 |
| | | | | 345/173 |
| 2012/0254804 | A1 * | 10/2012 | Sheha | G06Q 30/02 |
| | | | | 715/834 |
| 2013/0091578 | A1 * | 4/2013 | Bisht | G06F 21/53 |
| | | | | 726/25 |
| 2013/0120254 | A1 * | 5/2013 | Mun | G06F 3/017 |
| | | | | 345/158 |
| 2014/0002375 | A1 * | 1/2014 | Rydenhag | G06F 3/04883 |
| | | | | 345/173 |

(Continued)

*Primary Examiner* — William L Bashore
*Assistant Examiner* — Nathan K Shrewsbury
(74) *Attorney, Agent, or Firm* — Patterson & Sheridan, LLP (57) ABSTRACT

The disclosed embodiments provide a system that facilitates use of an electronic device. During operation, the system displays, by an application on the electronic device, a user interface comprising a first set of user-interface elements for obtaining data from a user. Upon detecting a first swiping gesture through the user interface, the system submits the data for processing by the application. The system then updates the user interface with a second set of user-interface elements based on the submitted data.

20 Claims, 7 Drawing Sheets

(56) References Cited

U.S. PATENT DOCUMENTS

| | | | |
|---|---|---|---|
| 2014/0096019 A1* | 4/2014 | Gowen | G06F 3/1204 715/738 |
| 2014/0189573 A1* | 7/2014 | Shuttleworth | G06F 3/017 715/780 |
| 2014/0245164 A1* | 8/2014 | Manoff | G06F 3/04883 715/738 |
| 2015/0026573 A1* | 1/2015 | Meng | G06F 8/61 715/716 |
| 2015/0095753 A1* | 4/2015 | Gajera | G06F 17/243 715/226 |
| 2015/0169168 A1* | 6/2015 | Vigneras | G06F 3/04883 715/739 |
| 2016/0062633 A1* | 3/2016 | Ahn | G06F 3/04883 345/173 |
| 2016/0147406 A1* | 5/2016 | Yi | G06F 3/04886 715/863 |
| 2016/0202900 A1* | 7/2016 | Manoff | G06F 3/04842 715/781 |
| 2016/0219027 A1* | 7/2016 | Kaplan | H04L 63/08 |
| 2016/0224213 A1* | 8/2016 | Chen | G06F 3/04842 |

\* cited by examiner

COMMITTING DATA IN ELECTRONIC DEVICES USING SWIPING GESTURES

BACKGROUND

Related Art

The disclosed embodiments relate to user interaction with electronic devices. More specifically, the disclosed embodiments relate to techniques for committing data in electronic devices using swiping gestures.

A user typically interacts with an electronic device, such as a personal computer, laptop computer, tablet computer, mobile phone, digital media receiver, and/or portable media player, by providing input to and receiving output from the electronic device through various input and output mechanisms. For example, the user may enter input into a laptop computer using a keyboard, mouse, and/or touchpad and receive output from the laptop computer via a display screen and/or speakers.

Applications on the electronic device may provide user interfaces (UIs) that facilitate interaction between the user and the electronic device. In addition, the UIs may be tailored to the input/output (I/O) devices and/or form factor of the electronic device. For example, a graphical user interface (GUI) of an application on a tablet computer may provide UI components such as windows, menus, icons, checkboxes, text boxes, and/or radio buttons. These UI components may be displayed to the user through a touchscreen of the tablet computer. In turn, the touchscreen may allow the user to manipulate the UI components using gestures such as swiping, zooming, and/or tapping. Because the tablet computer may lack a physical keyboard, the touchscreen may also provide a virtual keyboard that allows the user to enter alphanumeric input into the tablet computer.

Usability is an important consideration in designing user interfaces. In particular, usability considerations may include: the efficiency with which tasks are accomplished through the UI; the user's ability to learn and master the operation of the UI; and/or the availability of feedback, help, documentation, and/or status information within the UI. For example, the user may accomplish tasks more easily and quickly if UI elements are arranged and displayed in a meaningful way within the UI. Consequently, user satisfaction with an application on an electronic device may be highly influenced by characteristics of the user interface provided by the application and/or the user's ability to interact with the user interface through I/O devices of the electronic device.

SUMMARY

During use of an application on a mobile device such as a mobile phone or tablet computer, a user commonly enters data using a virtual keyboard on a touchscreen and submits the data by pressing a button in the touchscreen. However, the user may have difficulty accurately tapping the region of the touchscreen containing the button, which may disrupt the user experience with the application.

To improve the user's interaction with the application, the application may allow the user to submit data using a swiping gesture. In response to the swiping gesture, any data that was entered by the user may be submitted for processing by the application, and the user interface may be updated based on the submitted data. For example, the application may validate any data entered by the user through one or more form fields, radio buttons, checkboxes, text boxes, and/or other user-interface elements for completeness and/or formatting. If the data is valid, the application may "advance" the user to the next screen of the user interface. If an invalid data element is found in the submitted data, the application may display a notification of a validation failure to the user in lieu of the next screen.

The application may also update the user interface based on the direction of the swiping gesture. For example, the application may transition the user interface from the current screen to the next screen after detecting that the swiping gesture was made to the left. Conversely, the application may transition the user interface from the current screen to the previous screen after detecting that the swiping gesture was made to the right. Within a given screen, the application may display indications of one or more valid directions for performing the swiping gesture, such as arrows and/or edges of adjacent screens in the user interface. Because the swiping gesture may be easier or more "natural" to perform than pressing a button, the user experience with the application may be improved over that of a conventional application that obtains submitted data through button presses or other interaction with specific user-interface elements.

The disclosed embodiments provide a system that facilitates use of an electronic device. During operation, the system displays, by an application on the electronic device, a user interface comprising a first set of user-interface elements for obtaining data from a user. Upon detecting a first swiping gesture through the user interface, the system submits the data for processing by the application. The system then updates the user interface with a second set of user-interface elements based on the submitted data.

In some embodiments, the system also determines a direction of the swiping gesture, and updates the user interface with the second set of user-interface elements based on the direction of the first swiping gesture.

In some embodiments, the system also displays, in the user interface, a transition between the first set of user-interface elements and the second set of user-interface elements according to the direction of the first swiping gesture.

In some embodiments, the system displays, in the user interface, an indication of one or more valid directions for performing the first swiping gesture.

In some embodiments, the indication includes an arrow and/or an edge of an adjacent screen in the user interface.

In some embodiments, the system also validates the submitted data prior to updating the user interface with the second set of user-interface elements, and commits the submitted data to the application after the submitted data is validated.

In some embodiments, upon identifying an invalid data element in the submitted data, the system displays a notification of a validation failure in the user interface in lieu of the second set of user-interface elements.

In some embodiments, the invalid data element is a missing data element or an incorrectly formatted data element.

In some embodiments, the system also obtains additional data from the user through the second set of user-interface elements. Upon detecting a second swiping gesture through the user interface, the system submits the additional data for processing by the application. The system then updates the user interface with a third set of user-interface elements based on the submitted data and the submitted additional data.

In some embodiments, the first swiping gesture is used to submit the data and update the user interface based on the submitted data in lieu of a selection of a user-interface element by the user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Users commonly interact with applications through touchscreens on electronic devices such as mobile phones, tablet computers, laptop computers, and/or personal computers. For example, a user may enter data into an application using a virtual keyboard on a touchscreen of a mobile phone and submit the data to the application by pressing a button in the touchscreen. However, the user may have difficulty accurately tapping the region of the touchscreen containing the button, which may disrupt, complicate, and/or slow the user experience with the application.

To improve the user's interaction with the application, the application may allow the user to submit data using a swiping gesture. In response to the swiping gesture, any data that was entered by the user may be submitted for processing by the application, and the user interface may be updated based on the submitted data. For example, the application may validate any data entered by the user through one or more form fields, radio buttons, checkboxes, text boxes, and/or other user-interface elements for completeness and/or formatting. If the data is valid, the application may "advance" the user to the next screen of the user interface. If an invalid data element is found in the submitted data, the application may display a notification of a validation failure to the user in lieu of the next screen.

The application may also select the next screen to which the user is advanced based on the data entered in previous screens. For example, the application may select a screen that follows up on previously entered data and/or selected options from the user.

The application may additionally update the user interface and/or the state of the application based on the direction of the swiping gesture. For example, the application may transition the user interface from the current screen to the next screen after detecting that the swiping gesture was made to the left. Conversely, the application may transition the user interface from the current screen to the previous screen after detecting that the swiping gesture was made to the right. In another example, the application may launch, pause, or terminate a feature, window, pop-up, prompt, and/or other part of the application upon detecting the swiping gesture in a given direction.

Within a given screen, the application may display indications of one or more valid directions for performing the swiping gesture, such as arrows and/or edges of adjacent screens in the user interface. Because the swiping gesture may be easier or more "natural" to perform than pressing a button, the user experience with the application may be improved over that of a conventional application that obtains submitted data through button presses or other interaction with specific user-interface elements.

Figure 1:
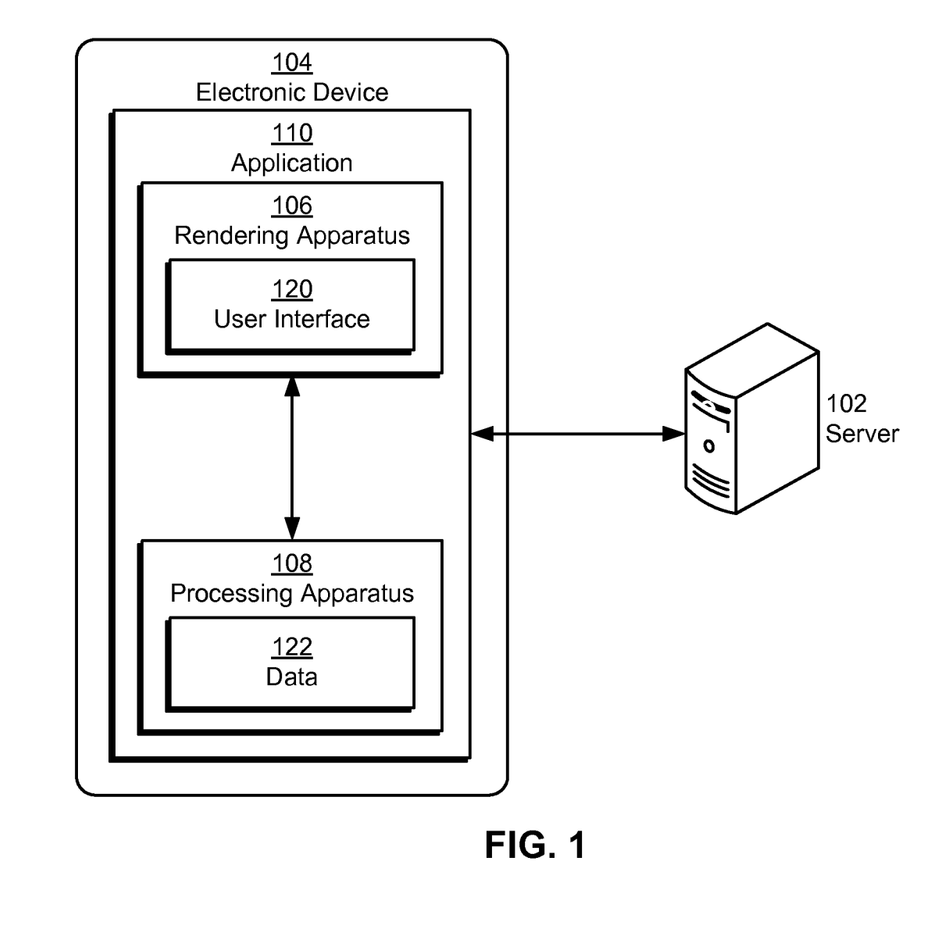
FIG. 1 shows a schematic of a system in accordance with the disclosed embodiments.

The disclosed embodiments provide a method and system for facilitating use of an electronic device. As shown in FIG. 1, an application 110 may reside on an electronic device 104 such as a mobile phone, personal computer, laptop computer, tablet computer, personal digital assistant, navigation system, digital camera, smart watch, and/or portable media player. For example, application 110 may be downloaded from an online application distribution platform, website, and/or server (e.g., server 102) and installed locally on electronic device 104. Alternatively, application 110 may be a web application that is loaded in a web browser of electronic device 104.

Application 110 may perform a set of tasks for a user of electronic device 104. For example, application 110 may allow the user to browse websites, send and receive emails, access and/or organize digital media, create and edit documents, play a game, use mapping and/or navigation services, file taxes, and/or manage personal finances.

During use of application 110, electronic device 104 may use a network connection to obtain data 122 and/or content associated with application 110 from a server 102 and transmit data from application 110 to server 102. For example, electronic device 104 may use a wired, wireless and/or cellular network to send and receive emails, financial information, digital media, game play information, and/or other data 122 or content used by application 110 with server 102. As a result, application 110 may execute using a client-server model.

In addition, interaction between the user and application 110 may be enabled by a user interface 120. For example, user interface 120 may be a graphical user interface (GUI) that displays text, images, documents, menus, icons, thumbnails, form fields, data 122, buttons, and/or other user-interface elements to the user. The GUI may also accept user input (e.g., gestures, keyboard presses, voice input, etc.) that is used to manipulate and/or update the elements. In other words, user interface 120 may be a mechanism for displaying or formatting data 122 or content associated with application 110 for use on electronic device 104.

In one or more embodiments, a rendering apparatus 106 in application 110 generates user interface 120 using content obtained from server 102. For example, rendering apparatus 106 may obtain structured data in one or more Extensible Markup language (XML) documents, JavaScript Object Notation (JSON) objects, and/or other types of structured, platform-agnostic data. Rendering apparatus 106 may then use natively executing user-interface components to render one or more views or screens of user interface 120 specified in the structured data. In addition, rendering of user interface 120 may vary with the platform and/or type of electronic device 104. For example, rendering apparatus 106 may tailor the layout of the views in user interface 120 based on the dimensions, orientation (e.g., portrait, landscape, etc.), form factor, and/or input/output (I/O) devices of electronic device 104.

Data 122 collected through user interface 120 may then be used by a processing apparatus 108 in application 110 to perform one or more tasks for the user. For example, processing apparatus 108 may validate data 122, format data 122, use data 122 entered by the user to update a state of application 110, use data 122 to generate additional data or files, and/or commit data 122 to storage on electronic device 104 and/or server 102.

Those skilled in the art will appreciate that the user experience with electronic device 104 may be strongly affected by the input/output (I/O) devices on electronic device 104 and the design of user interface 120. For example, entering and/or submitting text or data on a mobile device with limited I/O capabilities, such as a mobile phone, portable media player or tablet computer, may be more time-consuming and/or difficult than inputting the same text or data on a larger electronic device such as a personal or laptop computer.

At the same time, I/O devices and user interfaces on the mobile device may commonly emulate the I/O devices and user interfaces of the larger electronic device, even if such emulation reduces the usability of the mobile device. For example, the mobile device may emulate a physical keyboard on the larger electronic device through a virtual keyboard that is displayed in a touchscreen of the mobile device. Similarly, applications on the mobile device may interact with the user through user-interface elements that are also found on the larger electronic device, such as buttons, checkboxes, drop-down menus, and/or icons. However, providing input through the virtual keyboard or selecting a user-interface element on a small touchscreen of a mobile device may be slower and less accurate than providing input on a physical keyboard or using a cursor to select a user-interface element on a screen of the larger electronic device.

In one or more embodiments, application 110 includes functionality to facilitate user interaction with electronic device 104 by combining user input for committing data to application 110 with directional navigation within user interface 120. As described in further detail below, rendering apparatus 106 may allow the user to submit data 122 entered through user interface 120 using swiping gestures that are detected through user interface 120. Data 122 may then be validated, processed, and/or committed to storage and/or server 102 by processing apparatus 108 in application 108, and user interface 120 may be updated accordingly. Because swiping may be more intuitive or easy to perform on a touch-sensitive input device than selecting a button, such swiping-based submission of data 122 may improve the user experience over that of conventional user interfaces that require the user to select user-interface elements such as buttons to submit data.

Figure 2:
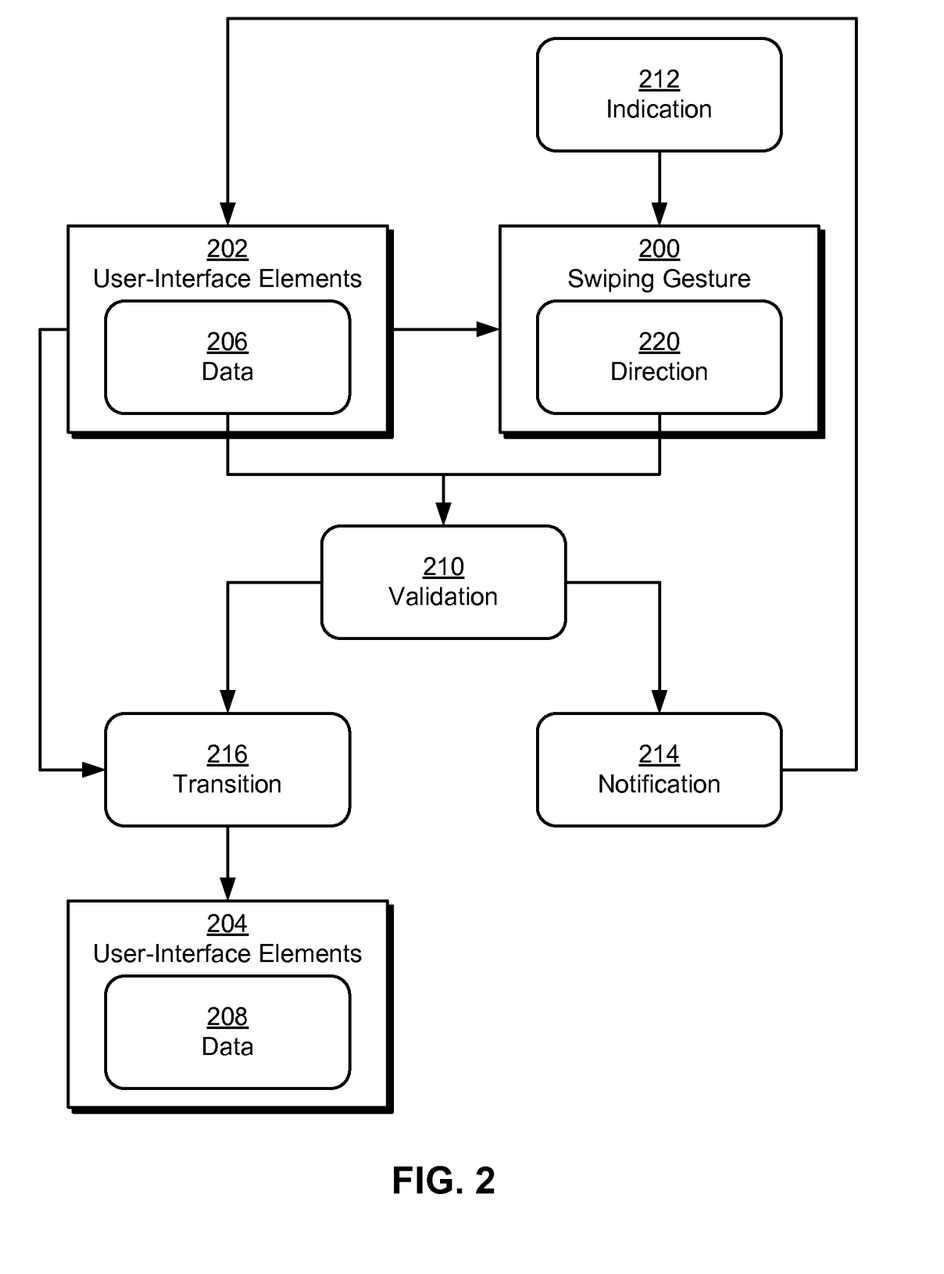
FIG. 2 shows an exemplary user interaction with an application on an electronic device in accordance with the disclosed embodiments.

FIG. 2 shows an exemplary user interaction with an application (e.g., application of FIG. 1) on an electronic device (e.g., electronic device 104 of FIG. 1) in accordance with the disclosed embodiments. During the user interaction, the user may use the application and one or more I/O devices on the electronic device to perform one or more tasks. For example, the user may use a touchscreen to provide touch-based input to the application and receive, in response to the input, visual output from the application through the touchscreen.

More specifically, the application may display a set of user-interface elements 202 in a user interface, such as user interface 120 of FIG. 1. User-interface elements 202 may include graphical representations of mechanisms for obtaining data 206 from the user. For example, user-interface elements 202 may include radio buttons, checkboxes, drop-down menus, multi-select elements, text boxes, form fields, sliders, and/or toggle buttons that are used to obtain information, preferences, text, files, images, audio, video, and/or other data 206 from the user.

To provide data 206 to the application, the user may use the user interface and I/O devices to interact with user-interface elements 202. For example, the user may use a virtual keyboard and touchscreen to enter text into form fields and text boxes; select radio buttons, checkboxes, and/or elements of drop-down menus or multi-select elements; and/or manipulate sliders or toggle buttons.

After the user has finished inputting data 206 through user-interface elements 202, the user may perform a swiping gesture 200 to submit the data for processing by the application. Swiping gesture 200 may be performed on a touch-sensitive input device such as a touchpad or touchscreen. For example, swiping gesture 200 may be performed on a touchscreen of a mobile device by moving a finger, stylus, or other conductive object across a portion of the touchscreen. In another example, swiping gesture 200 may be detected by a motion-sensing device as a motion of a hand or other object across the space monitored by one or more sensors in the motion-sensing device. Swiping gesture 200 may additionally be performed with a certain speed; for example, swiping gesture 200 may be faster than a dragging gesture that is used to manipulate the locations of user-interface elements 200 within a screen of the user interface.

To facilitate submission of data 206 and use of the user interface, the application may display an indication 212 of one or more valid directions for performing swiping gesture 200. For example, the application may show one or more arrows and/or edges of adjacent screens in the user interface to assist the user with identifying valid swiping gestures that can be performed on the current screen of the user interface. In turn, indication 212 may assist the user with executing swiping gesture 200 in a direction 220 (e.g., up, down, left, right, etc.) that advances use of the application and/or navigation within the application. Indications of valid directions for performing swiping gestures for committing data in electronic devices are described in further detail below with respect to FIG. 3A.

Once swiping gesture 200 is detected, the user interface may submit data 206 for processing by the application. First, the application may perform a validation 210 of data 206. During validation 210, the application may verify that data 206 is complete and formatted correctly. For example, the application may analyze a data element from data 206 that represents a Social Security number (SSN) to ensure that the data element has a non-null, nine-digit numeric value.

If the application identifies an invalid data element, the application may display a notification 214 of a validation failure in the user interface. For example, the application may update the screen containing user-interface elements 202 with text requesting that the user provide or correct the invalid data element. Notifications of validation failures in user interfaces for committing data using swiping gestures are described in further detail below with respect to FIG. 3B.

Once the formatting and completeness of all data 206 is validated, the application may update the user interface with a second set of user-interface elements 204, which may optionally be used to obtain additional data 208 from the user. For example, the application may replace user-interface elements 202 with user-interface elements 204 that follow up on data 206 obtained through user-interface elements 202. The application may also display a transition 216 between user-interface elements 202 and user-interface elements 204, such as a sliding animation, a fading effect, and/or a stacking animation. In other words, user-interface elements 204 may be selected or formatted for display within the user interface based on data 206 submitted using user-interface elements 202 and swiping gesture 200. Alternatively, user-interface elements 204 may be used to display information to the user instead of obtaining data 208 from user. Updating of user-interface elements in user interfaces for committing data using swiping gestures is described in further detail below with respect to FIG. 3C.

User-interface elements 204 may additionally be based on direction 220 of swiping gesture 200. For example, a leftward direction 220 of swiping gesture 200 may generally represent advancing in the application, while a rightward direction 220 of swiping gesture 200 may generally represent going back in the application. Upon detecting swiping gesture 200 in the leftward direction 220, the application may replace user-interface elements 202 with a set of user-interface elements 204 for a next screen of the user interface. Conversely, the application may replace user-interface elements 202 with a set of user-interface elements 204 for a previous screen of the user interface upon detecting swiping gesture 200 in the rightward direction 220. If the user uses swiping gesture 200 to navigate back to the previous screen, validation 210 of data 206 in user-interface elements 202 may optionally be omitted because the user is not formally advancing in his/her use of the application.

The user interaction described above may be repeated for each screen and/or set of user-interface elements shown in the application. For example, the user may use swiping gestures to navigate across a series of screens of the application, submit data (e.g., data 206-208) to the application, and/or receive information from the application.

Because the swiping gestures may integrate intuitive, directional navigation within the application with the submission of data to the application, user interaction with the application may be more efficient and less prone to error than with an application that commits data through the selection of user-interface elements such as buttons. Consequently, the disclosed embodiments may provide improvements in the technical fields of user interfaces, electronic devices, and human-computer interaction (HCI).

Figure 3A:
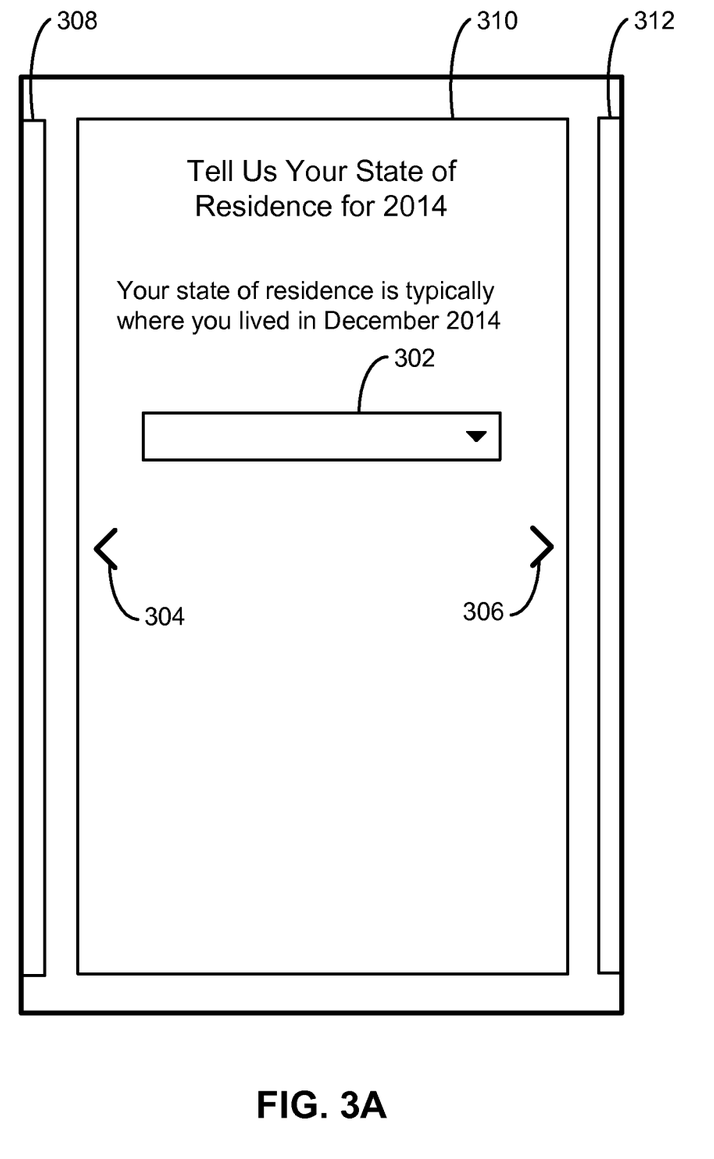
FIG. 3A shows an exemplary screenshot in accordance with the disclosed embodiments.

FIG. 3A shows an exemplary screenshot in accordance with the disclosed embodiments. More specifically, FIG. 3A shows a screenshot of a user interface for an application, such as user interface 120 of FIG. 1. As shown in FIG. 3A, the user interface includes a screen 310 containing a user-interface element 302.

User-interface element 302 may be used to obtain data from a user. For example, user-interface element 302 may be a drop-down menu that allows the user to provide a state of residence for the year of 2014 to a tax-preparation application. To specify the state of residence, the user may activate the drop-down menu by tapping on the region of screen 310 containing user-interface element 302, scrolling within the activated drop-down menu to locate a particular state name, and tapping on the state name. Once the state name is selected, user-interface element 302 may be updated so that the state name is displayed within the box representing the drop-down menu.

As described above, the user interface may allow the user to submit data in user-interface element 302 using a swiping gesture. To aid the user in using the application, the user interface may include a number of indications of valid directions for performing swiping gestures, and in turn, directionally navigating within the user interface. First, the user interface may include a number of arrows 304-306 that point in the valid directions. For example, arrow 304 may indicate that a swiping gesture to the left is valid, and arrow 306 may indicate that a swiping gesture to the right is valid. Arrows 304-306 may be displayed temporarily within the user interface. For example, arrows 304-306 may be flashed for a number of seconds after the user navigates to screen 310. Alternatively, arrows 304-306 may continue to be displayed while the user remains on screen 310.

Second, the user interface may show the edges of screens 308 and 312 that are adjacent to screen 310. For example, the user interface may show the rightmost edge of a previous screen 308 in the user interface, as well as the leftmost edge of a next screen 312 in the user interface. The edges of screens 308 and 312 may indicate that the user is allowed to perform a swiping gesture to the left to advance to the next screen 312 and a swiping gesture to the right to return to the previous screen 308.

Figure 3B:
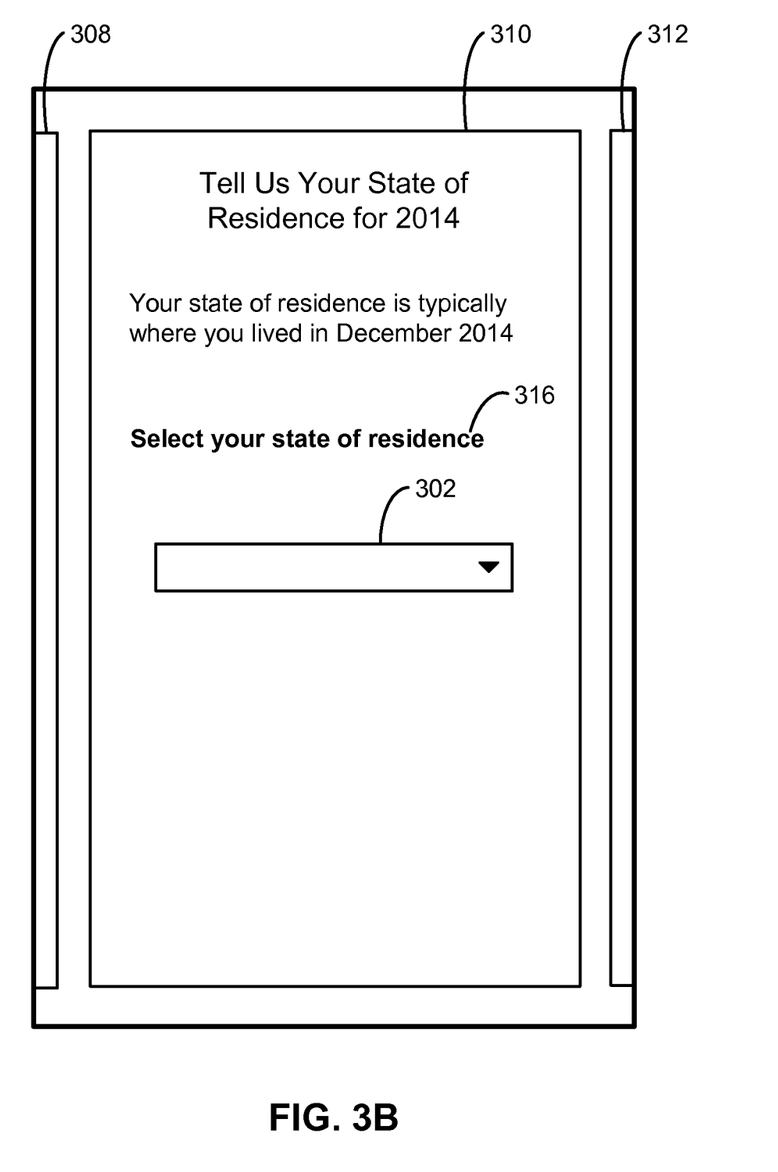
FIG. 3B shows an exemplary screenshot in accordance with the disclosed embodiments.

FIG. 3B shows an exemplary screenshot in accordance with the disclosed embodiments. In particular, FIG. 3B shows the screenshot of FIG. 3A after the user has performed a leftward swiping gesture without entering data into user-interface element 302. Because user-interface element 302 lacks a required data element (e.g., a state of residence), the application may fail to validate any data that was submitted with the leftward swiping gesture.

Because an invalid data element was found, the application may prevent the user from advancing to the next screen 312 of the user interface. Instead, the application may display a notification 316 (e.g., "Select your state of residence") of the validation failure within the current screen 310. Notification 316 may prompt the user to correct the validation failure by providing the missing data element (e.g., a state of residence) before attempting to advance to the next screen 312.

Figure 3C:
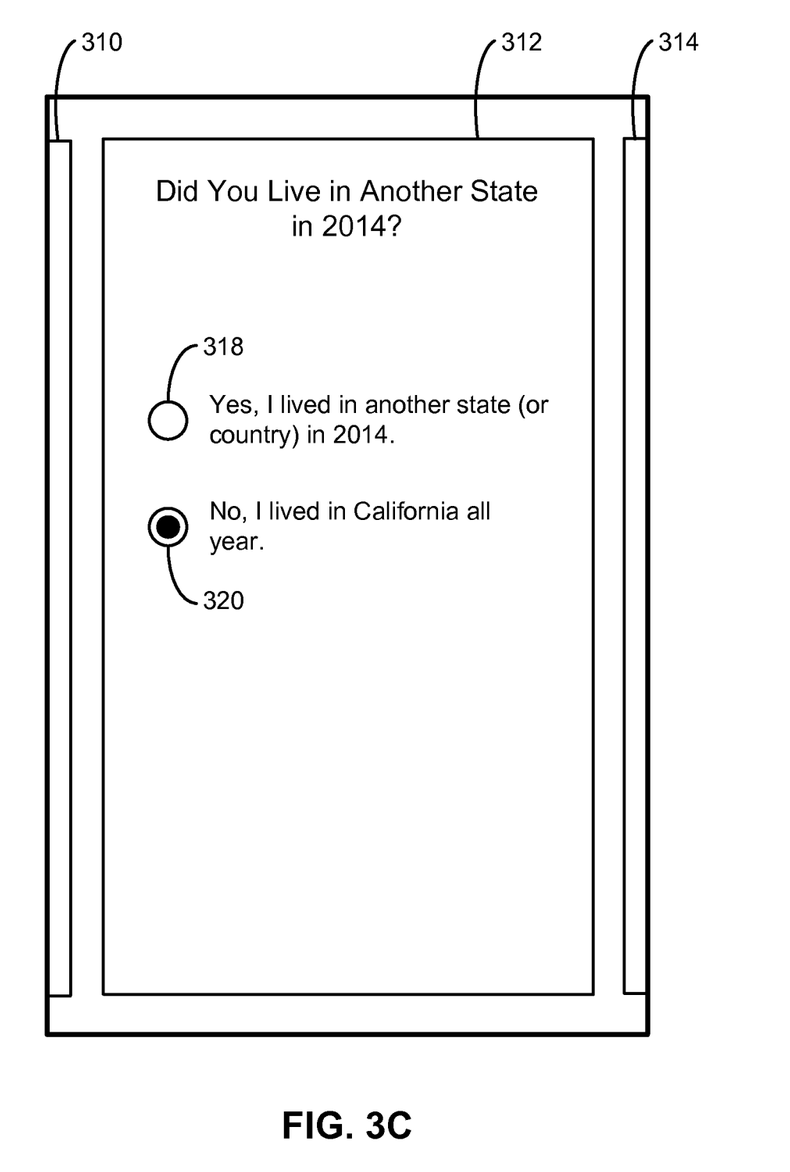
FIG. 3C shows an exemplary screenshot in accordance with the disclosed embodiments.

FIG. 3C shows an exemplary screenshot in accordance with the disclosed embodiments. More specifically, FIG. 3C shows the screenshot of FIG. 3A or 3B after the user has entered data into user-interface element 302 and executed a leftward swiping gesture. In response, the application may update the user interface to show screen 312 instead of screen 310. For example, the application may display a transition that moves screens 310-312 in a leftward direction until only the rightmost edge of screen 310 is displayed and screen 312 is centered within the user interface. The application may also display the leftmost edge of a new screen 314 to the right of screen 312 to indicate that screen 312 is not the last screen of the user interface's current navigation flow. As a result, the user may perform another leftward swiping gesture to advance from screen 312 to screen 314 in the user interface.

As shown in FIG. 3C, screen 312 may include a new set of user-interface elements 318-320. For example, user-interface elements 318-320 may be radio buttons that allow the user to select one of two options before advancing to screen 314. In addition, information accompanying user-interface elements 318-320 may be displayed based on data submitted in screen 310. For example, the description of user-interface element 320 (e.g., "No, I lived in California all year.") may be generated based on a state name (e.g., California) entered by the user in user-interface element 302 and submitted with the leftward swiping gesture that triggered the navigation from screen 310 to screen 312 in the user interface.

Data entered by the user in previous screens of the user interface may continue to affect the subsequent navigation flow and/or screens of the user interface. For example, the selected state of residence from user-interface element 302 may be combined with a tax filing status and/or other data entered by the user to generate a navigation flow for obtaining data related to filing state income taxes for the selected state. The application may continue updating the user interface based on swiping gestures, entered data, and/or other user input until the user has finished interacting with the application.

Figure 4:
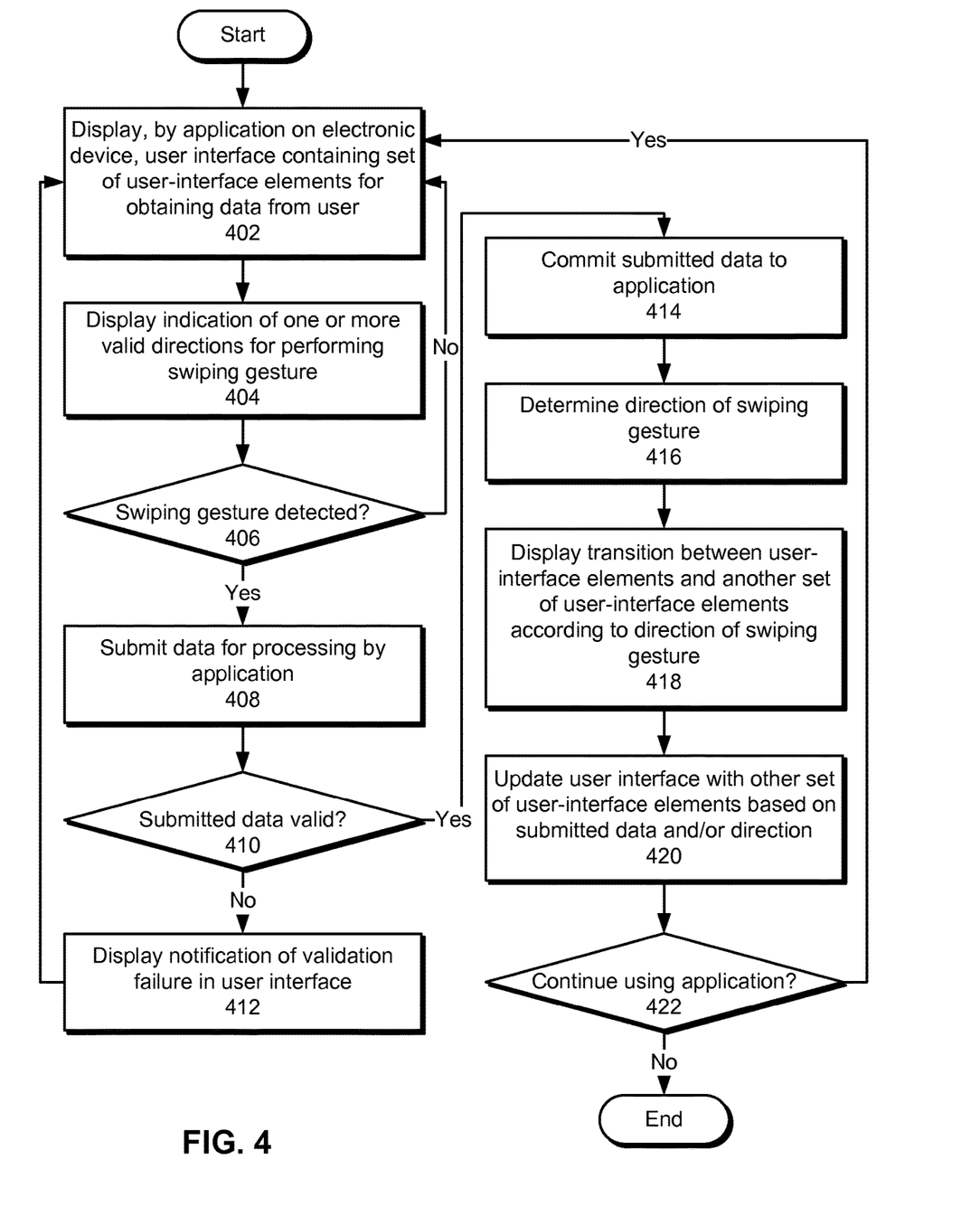
FIG. 4 shows a flowchart illustrating the process of facilitating use of an electronic device in accordance with the disclosed embodiments.

FIG. 4 shows a flowchart illustrating the process of facilitating use of an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a user interface containing a set of user-interface elements for obtaining data from a user is displayed by an application on an electronic device (operation 402). For example, the application may display checkboxes, radio buttons, drop-down menus, multi-select elements, text boxes, form fields, sliders, toggles, and/or other user-interface elements within a screen of the user interface. The user may interact with the user-interface element to provide information, preferences, files, media, and/or other data to the application.

Next, an indication of one or more valid directions for performing a swiping gesture is displayed (operation 404). For example, one or more arrows and/or edges of adjacent screens in the user interface may be shown to guide the user in using the application and/or navigating within the user interface.

A swiping gesture may be detected (operation 406) through the user interface. For example, the swiping gesture may be detected as the motion of one or more fingers or other conductive objects across a touchpad, touchscreen, and/or other touch-sensitive input device. The swiping gesture may be easier to perform than a gesture that is affected by the region of the touch-sensitive input device contacted by the conductive object(s), such as the localized selection of a button or other user-interface element. If no swiping gesture is detected, the user-interface elements and indication may continue to be displayed in the user interface (operations 402-404).

After the swiping gesture is detected, data obtained through the displayed user-interface elements is submitted for processing by the application (operation 408). During processing of the data, the data may be examined for validity (operation 410). For example, the data may be analyzed for completeness and/or formatting. If the data includes an invalid data element, a notification of a validation failure is displayed in the user interface (operation 412) with the user-interface elements and/or indication (operations 402-404). For example, the application may display text that prompts the user to provide a missing data element and/or correct an incorrectly formatted data element.

The validation failure may continue to be displayed until the user corrects all invalid data elements and performs another swiping gesture. Once the data is validated, the submitted data is committed to the application (operation 414). For example, the submitted data may be stored by the application and/or transmitted to a server for subsequent storage and/or processing.

The direction of the swiping gesture is also determined (operation 416). For example, the swiping gesture may be detected to be in a substantially upward, downward, leftward, or rightward direction by an input device, device driver, operating system, and/or another component of the electronic device. A transition between the user-interface elements displayed in operation 402 and another set of user-interface elements is then displayed according to the direction of the swiping gesture (operation 418). For example, the application may transition between two screens containing the two sets of user-interface elements by moving the first screen off the user interface and the second screen onto the user interface in the direction of the swiping gesture. At the end of the transition, the user-interface has been updated with the other set of user-interface elements based on the submitted data and/or the direction of the swiping gesture (operation 420). Consequently, the swiping gesture may be used to submit the data and update the user interface based on the submitted data in lieu of other user input, such as selecting a user-interface element (e.g., a "Continue" button) in the user interface.

The application may continue to be used (operation 422) by the user. During use of the application, a set of user-interface elements is displayed in the current screen of the user interface (operation 402), along with an indication of one or more valid directions for performing a swiping gesture (operation 404). The data may be validated and/or committed based on the swiping gesture (operations 406-414), and the user interface may be updated based on the data and the direction of the swiping gesture (operations 416-420). Such swiping-based navigation of the user interface and committing of data may continue until the user's interaction with the application is completed.

Figure 5:
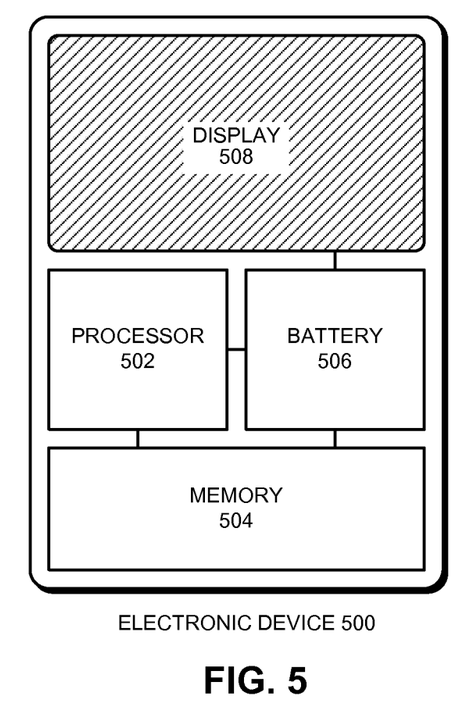
FIG. 5 shows a computer system in accordance with the disclosed embodiments.

FIG. 5 shows an electronic device 500 in accordance with an embodiment. Electronic device 500 may correspond to an apparatus that includes a processor 502, memory 504, and/or other components found in electronic computing devices. The components of electronic device 500 may be powered by a battery 506. Processor 502 may support parallel processing and/or multi-threaded operation with other processors in electronic device 500. Electronic device 500 may also include input/output (I/O) devices such as a display 508, which can be a touch-sensitive display.

Electronic device 500 may include functionality to execute various components of the present embodiments. In particular, electronic device 500 may include an operating system (not shown) that coordinates the use of hardware and software resources on electronic device 500, as well as one or more applications that perform specialized tasks for the user. To perform tasks for the user, applications may obtain the use of hardware resources on electronic device 500 from the operating system, as well as interact with the user through a hardware and/or software framework provided by the operating system.

In one or more embodiments, electronic device 500 provides a system for facilitating use of electronic device 500. The system may include a rendering apparatus that displays a user interface containing a first set of user-interface elements for obtaining data from a user. Upon detecting a first swiping gesture through the user interface, the rendering apparatus may submit the data for processing by a processing apparatus. The rendering apparatus may then update the user interface with a second set of user-interface elements based on the submitted data.

The system may also include the processing apparatus. The processing apparatus may process and/or validate the submitted data. If the submitted data is validated, the processing apparatus may commit the submitted data to the application. If the processing apparatus identifies an invalid data element in the submitted data, the rendering apparatus may display a notification of a validation failure in the user interface in lieu of the second set of user-interface elements.

In addition, one or more components of electronic device 500 may be remotely located and connected to the other components over a network. Portions of the present embodiments (e.g., rendering apparatus, processing apparatus, server, etc.) may also be located on different nodes of a distributed system that implements the embodiments. For example, the present embodiments may be implemented using a cloud computing system that processes data and gestures from a set of users through a set of remote electronic devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating use of a mobile device comprising a touchscreen, the method comprising:
   receiving, from a server by the mobile device, application content associated with an application installed locally on the mobile device, wherein the application can be navigated by a user to advance through a set of application screens, wherein a sequence of the set of application screens displayed is based on data collected from the user via the set of application screens;
   displaying, by the application on the mobile device, a first application screen of the set of application screens comprising a first set of user-interface elements for obtaining data from the user based on the application content;
   obtaining, by the application, text data from a first user-interface element of the first set of user-interface elements;
   receiving touch data from the touchscreen;
   determining, based on the touch data, a swipe gesture has been performed by the user, wherein the swipe gesture indicates the user intends to advance to a next screen of the application;
   determining, based on the touch data, a speed of the swipe gesture; and
   upon determining the speed of the swipe gesture is greater than a threshold speed:
      determining a category of the text data associated with the first user-interface element from which the text data was received;
      validating the text data satisfies a compliance rule associated with the category of the text data, wherein the compliance rule is used to determine if the text data is complete for the category of the text data;
      without receiving additional input from the user and based on the swipe gesture, transmitting the text data received from at least one user interface element to the server;
      receiving additional application content from the server associated with a second application screen of the set of application screens, wherein the server determines to advance the user to the second application screen as the next screen based on processing performed on the text data; and
      displaying, by the application, the second application screen comprising a second set of user-interface elements based on the additional application content.

2. The method of claim 1, further comprising:
determining a direction of the swipe gesture; and
displaying the second set of user-interface elements based on the direction of the swipe gesture.

3. The method of claim 2, further comprising:
displaying a transition between the first application screen and the second application screen according to the direction of the swipe gesture.

4. The method of claim 2, further comprising:
displaying an indication of one or more valid directions for performing the swipe gesture.

5. The method of claim 4, wherein the indication comprises at least one of:
an arrow; and
an edge of an adjacent screen.

6. The method of claim 1, further comprising:
identifying an invalid data element in the text data; and
displaying a notification of a validation failure in lieu of the second application screen.

7. The method of claim 6, wherein the invalid data element is at least one of:
a missing data element; and
an incorrectly formatted data element.

8. The method of claim 1, wherein the swipe gesture is used to submit the text data and update the application based on the validated data in lieu of a selection of a user-interface element by the user.

9. The method of claim 1, further comprising:
determining the text data does not satisfy the compliance rule;

displaying a correction user-interface; and
receiving through the correction user-interface from the user, a correction to the text data.

10. A mobile device, comprising:
a touchscreen;
a memory comprising executable instructions; and
a processor configured to execute the executable instructions and cause the mobile device to:
receive, from a server by the mobile device, application content associated with an application installed locally on the mobile device, wherein the application can be navigated by a user to advance through a set of application screens, wherein a sequence of the set of application screens displayed is based on data collected from the user via the set of application screens;
display, by the application on the mobile device, a first application screen of the set of application screens comprising a first set of user-interface elements for obtaining data from the user based on the application content;
obtain, by the application, text data from a first user-interface element of the first set of user-interface elements;
receive touch data from the touchscreen;
determine, based on the touch data, a swipe gesture has been performed by the user, wherein the swipe gesture indicates the user intends to advance to a next screen of the application;
determine, based on the touch data, a speed of the swipe gesture; and
upon determining the speed of the swipe gesture is greater than a threshold speed:
determine a category of the text data associated with the first user-interface element from which the text data was received;
validate the text data satisfies a compliance rule associated with the category of the text data, wherein the compliance rule is used to determine if the text data is complete for the category of the text data;
without receiving additional input from the user and based on the swipe gesture, transmit the text data received from at least one user interface element to the server;
receive additional application content from the server associated with a second application screen of the set of application screens, wherein the server determines to advance the user to the second application screen as the next screen based on processing performed on the text data; and
display, by the application, the second application screen comprising a second set of user-interface elements based on the additional application content.

11. The mobile device of claim 10, being further configured to:
determine a direction of the swipe gesture; and
display the second application screen based on the direction of the swipe gesture.

12. The mobile device of claim 11, being further configured to:
display a transition between the first application screen and the second application screen according to the direction of the swipe gesture.

13. The mobile device of claim 11, being further configured to:
display an indication of one or more valid directions for performing the swipe gesture.

14. The mobile device of claim 10, being further configured to identify an invalid data element in the text data, and
display a notification of a validation failure in lieu of the second application screen in response to the invalid data element.

15. A non-transitory computer-readable storage medium storing instructions that when executed by a mobile device comprising a touchscreen device cause the mobile device to perform a method for facilitating use of the mobile device, comprising:
receiving, from a server by the mobile device, application content associated with an application installed locally on the mobile device, wherein the application can be navigated by a user to advance through a set of application screens, wherein a sequence of the set of application screens displayed is based on data collected from the user via the set of application screens;
displaying, by the application on the mobile device, a first application screen of the set of application screens comprising a first set of user-interface elements for obtaining data from the user based on the application content;
obtaining, by the application, text data from a first user-interface element of the first set of user-interface elements;
receiving touch data from the touchscreen device;
determining, based on the touch data, a swipe gesture has been performed by the user wherein the swipe gesture indicates the user intends to advance to a next screen of the application;
determining, based on the touch data, a speed of the swipe gesture; and
upon determining the speed of the swipe gesture is greater than a threshold speed:
determining a category of the text data associated with the first user-interface element from which the text data was received;
validating the text data satisfies a compliance rule associated with the category of the text data, wherein the compliance rule is used to determine if the text data is complete for the category of the text data;
without receiving additional input from the user and based on the swipe gesture, transmitting the text data received from at least one user interface element to the server;
receiving additional application content from the server associated with a second application screen of the set of application screens, wherein the server determines to advance the user to the second application screen as the next screen based on processing performed on the text data; and
displaying, by the application, the second application screen comprising a second set of user-interface elements based on the additional application content.

16. The non-transitory computer-readable storage medium of claim 15, the method further comprising:
determining a direction of the swipe gesture;
displaying the second application screen based on the direction of the swipe gesture; and
displaying a transition between the first application screen and the second application screen according to the direction of the swipe gesture.

17. The non-transitory computer-readable storage medium of claim 15, the method further comprising:
identifying an invalid data element in the text data; and displaying a notification of a validation failure in lieu of the second application screen.

18. The non-transitory computer-readable storage medium of claim 17, wherein the invalid data element is at least one of:
a missing data element; and
an incorrectly formatted data element.

19. The non-transitory computer-readable storage medium of claim 15, wherein the swipe gesture is used to submit the text data and update the application based on the text data in lieu of a selection of a user-interface element by the user.

20. The mobile device of claim 10, being further configured to:
determine the text data does not satisfy the compliance rule;
display a correction user-interface; and
receive through the correction user-interface from the user, a correction to the text data.

* * * * *